(No Model.) 10 Sheets—Sheet 1.
C. H. HORNE.
CONSTRUCTING RAILROADS.
No. 387,560. Patented Aug. 7, 1888.
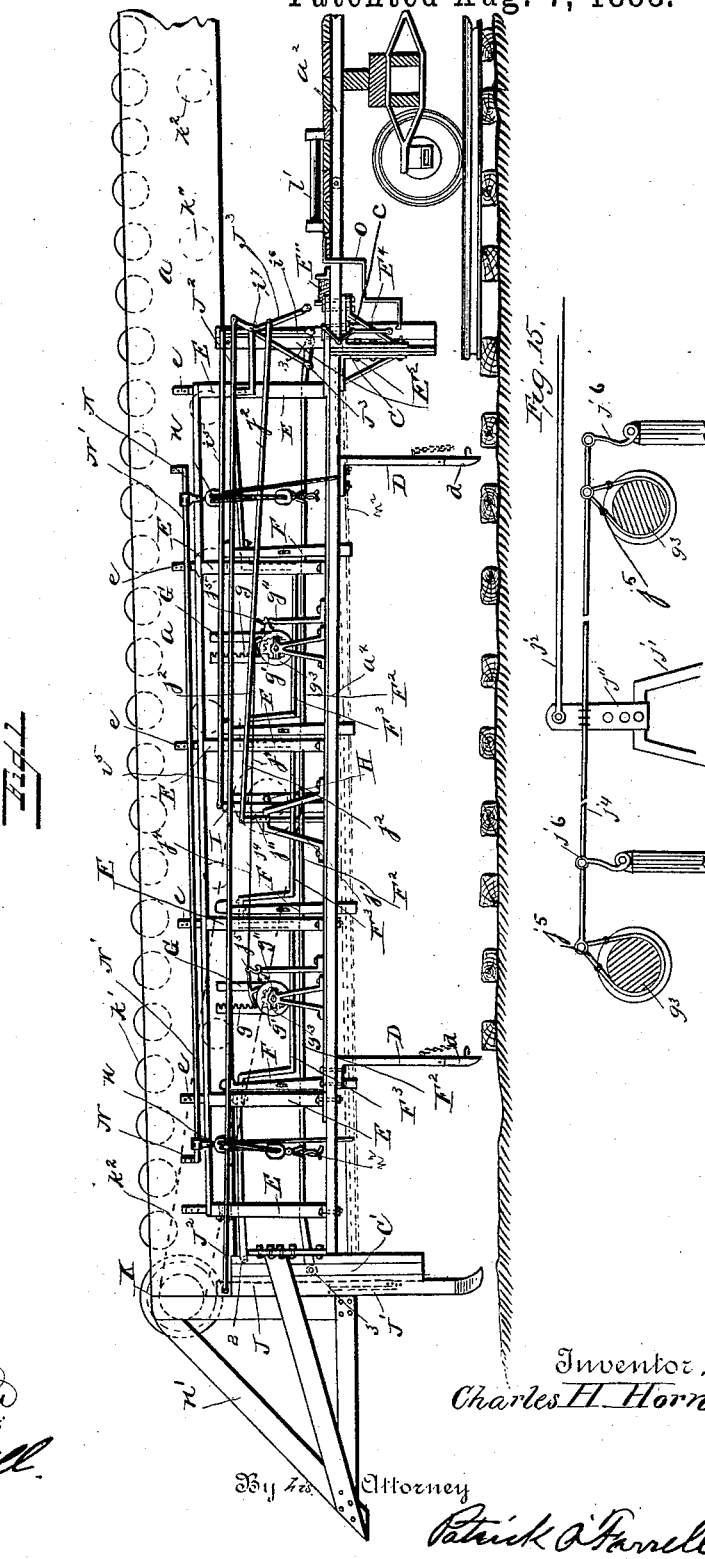
Witnesses.
John Enders
Thos W. McGill
Inventor,
Charles H. Horne,
By his Attorney
Patrick O'Farrell
N. PETERS, Photo-Lithographer, Washington, D. C.

(No Model.) 10 Sheets—Sheet 2.
C. H. HORNE.
CONSTRUCTING RAILROADS.
No. 387,560. Patented Aug. 7, 1888.
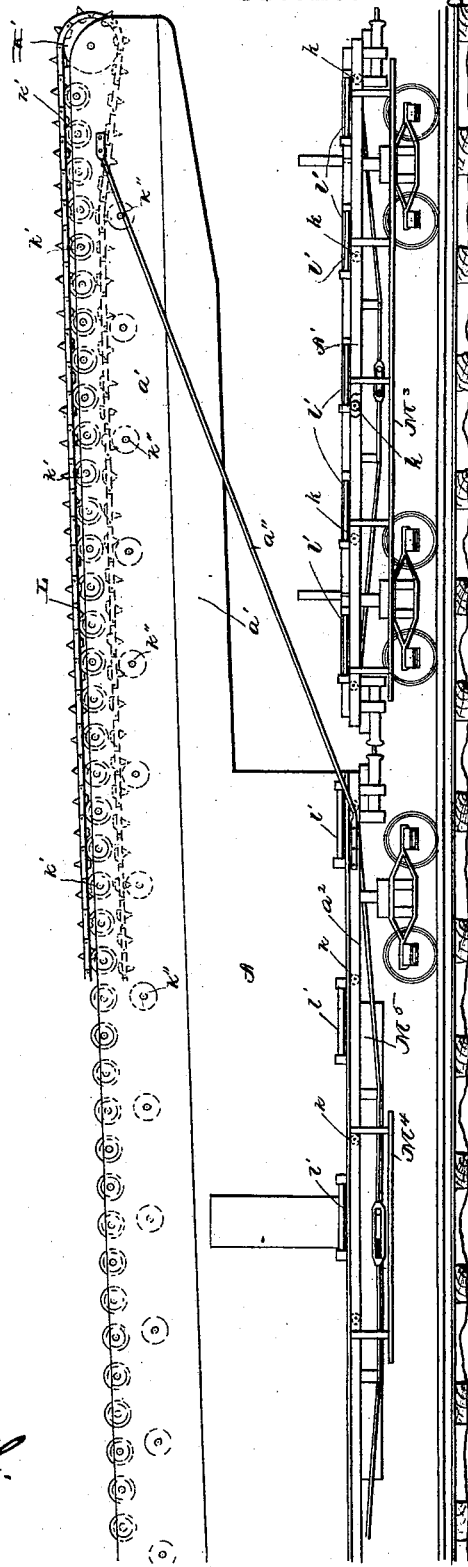

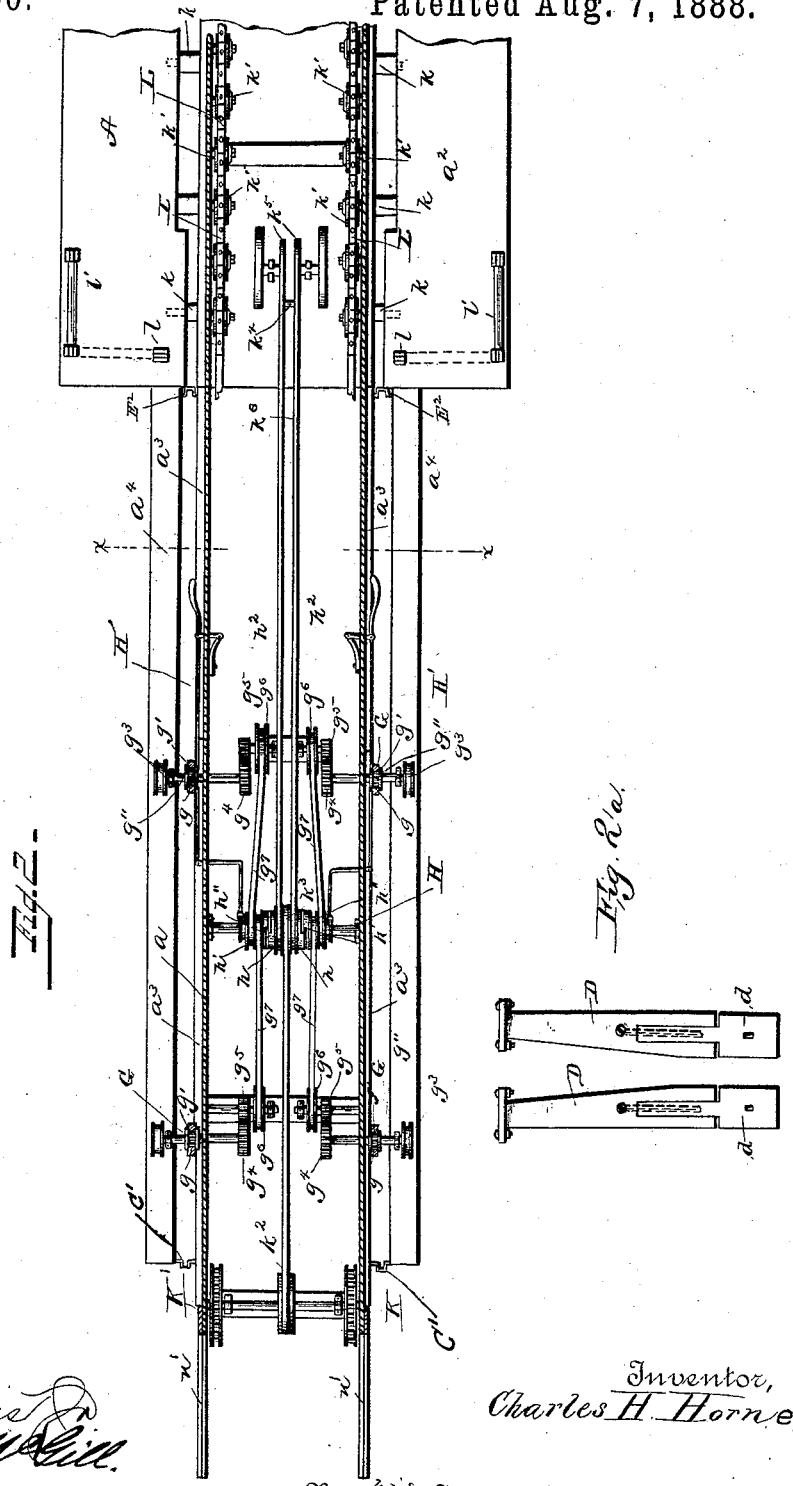

(No Model.) 10 Sheets—Sheet 4.
C. H. HORNE.
CONSTRUCTING RAILROADS.
No. 387,560. Patented Aug. 7, 1888.
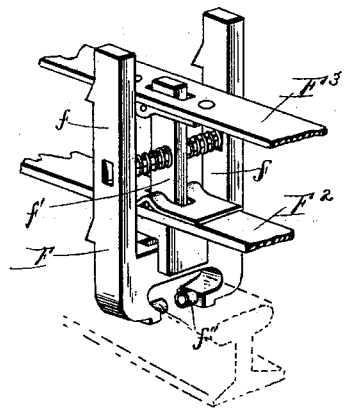
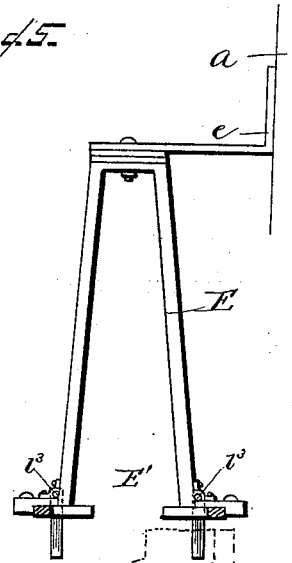
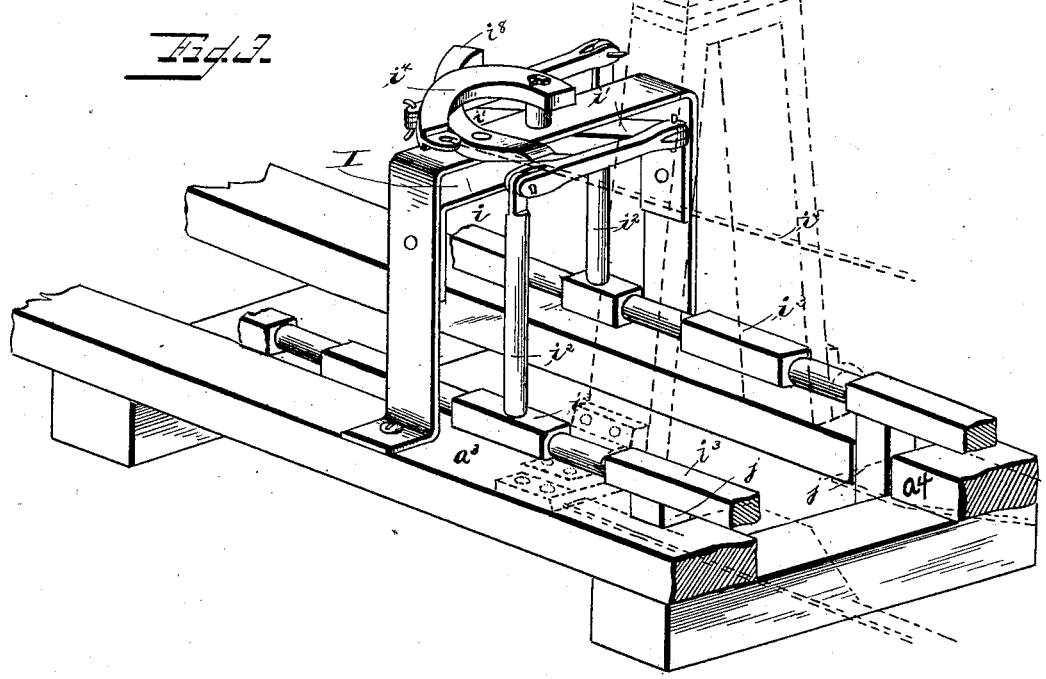
Witnesses,
John Enders
Inventor,
Charles H. Horne.
By his Attorney
Patrick O'Farrell

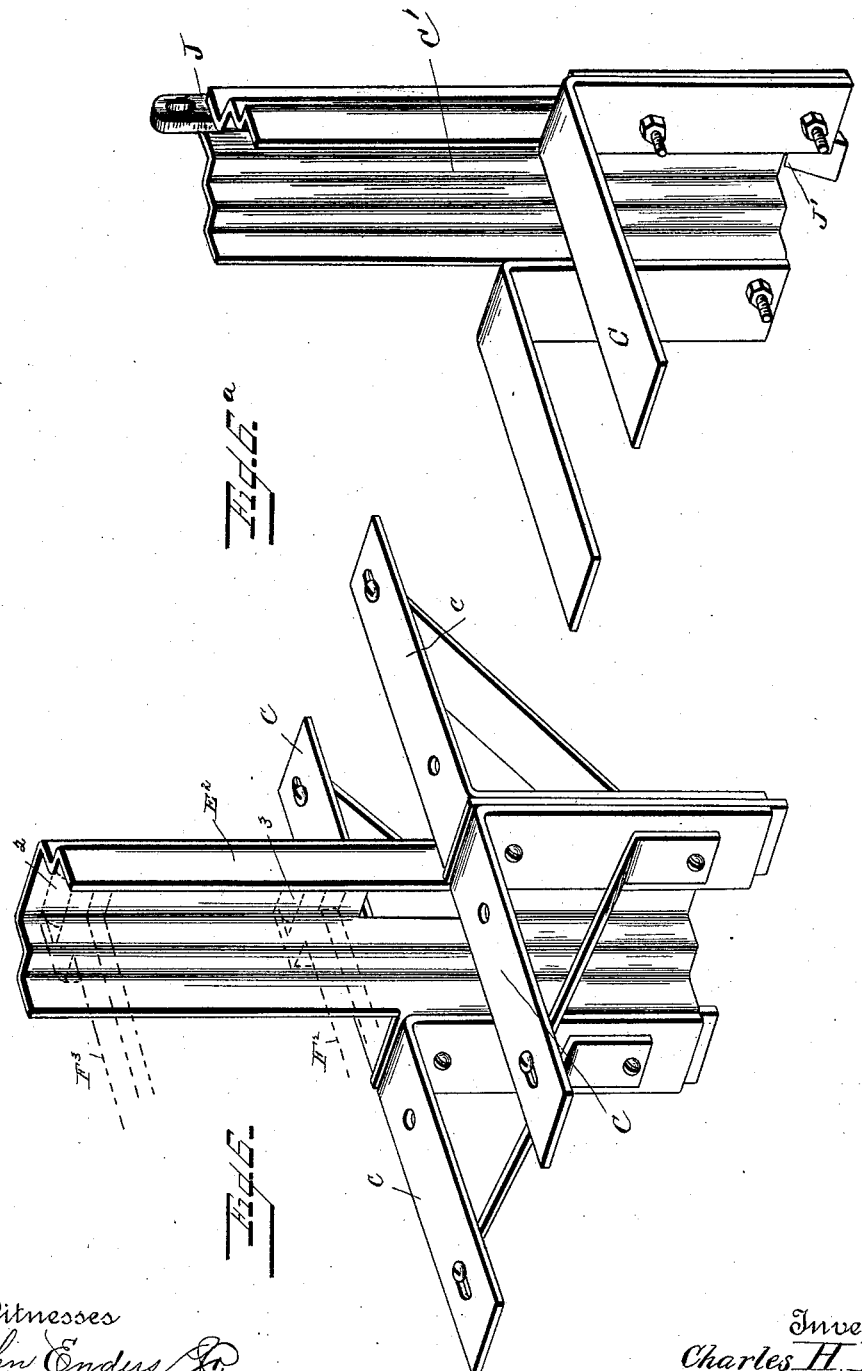

(No Model.) 10 Sheets—Sheet 6.
C. H. HORNE.
CONSTRUCTING RAILROADS.
No. 387,560. Patented Aug. 7, 1888.
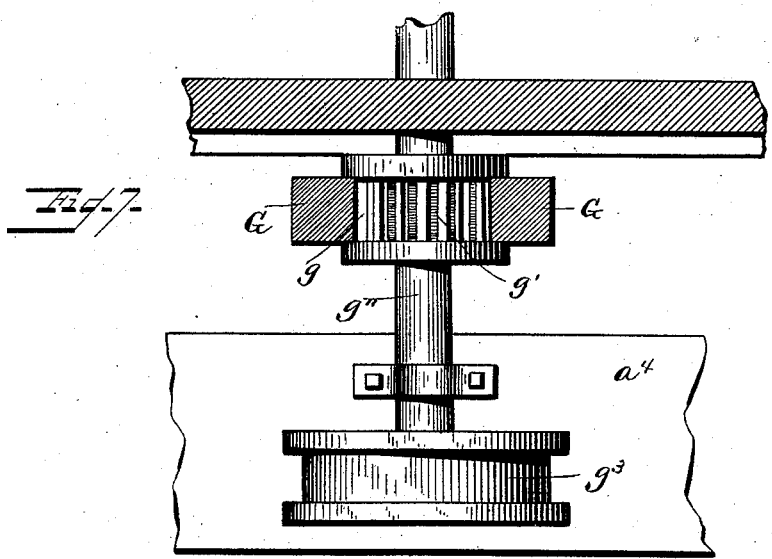
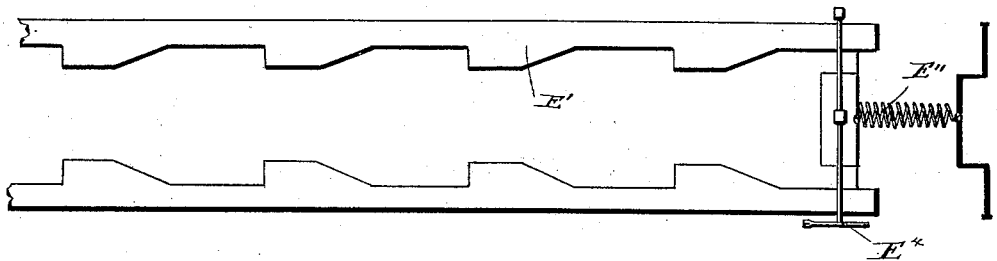
Witnesses,
John Enders Jr.
J. Nold McGill.
Inventor,
Charles H. Horne,
By his Attorney
Patrick A. Farrell,

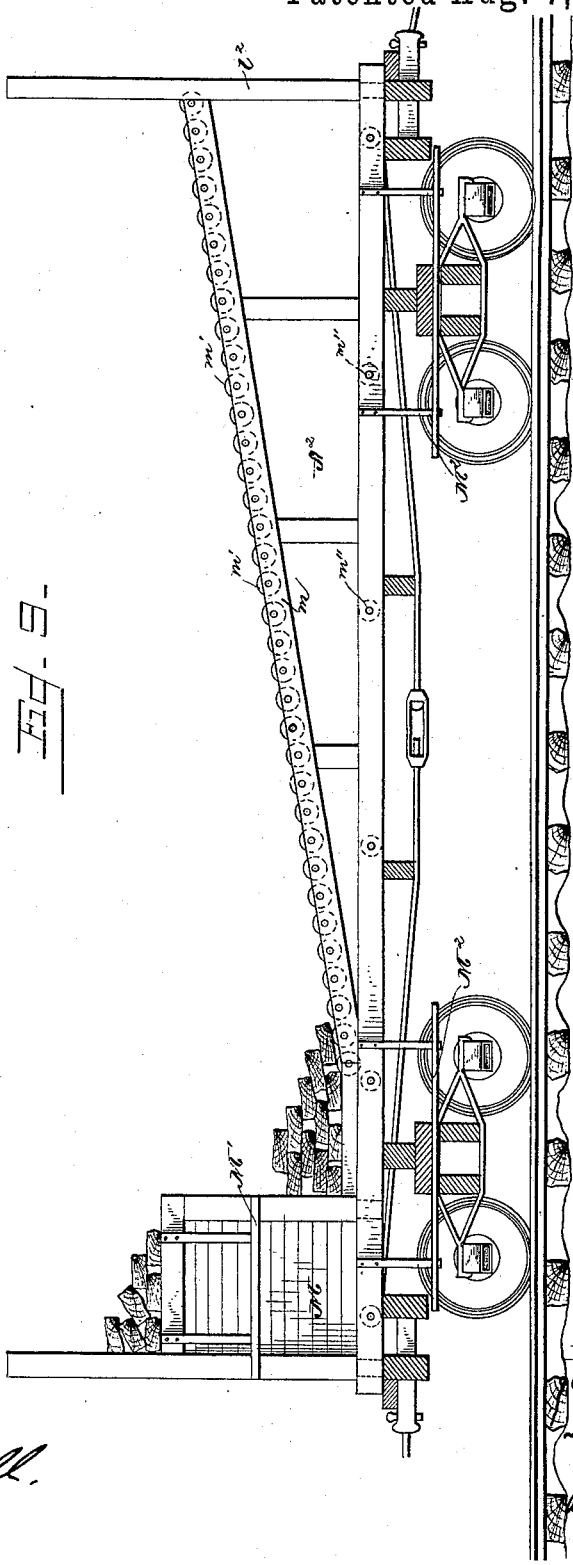

(No Model.) 10 Sheets—Sheet 8.

C. H. HORNE.
CONSTRUCTING RAILROADS.

No. 387,560. Patented Aug. 7, 1888.

Witnesses:
John Enders Jr.

Inventor:
Charles H. Horne,
By Patrick O'Farrell,
Attorney.

(No Model.) 10 Sheets—Sheet 9.

C. H. HORNE.
CONSTRUCTING RAILROADS.

No. 387,560. Patented Aug. 7, 1888.

WITNESSES,
Edwin T. Yewell.

INVENTOR,
Chas. H. Horne.
Patrick O'Farrell.
Attorney.

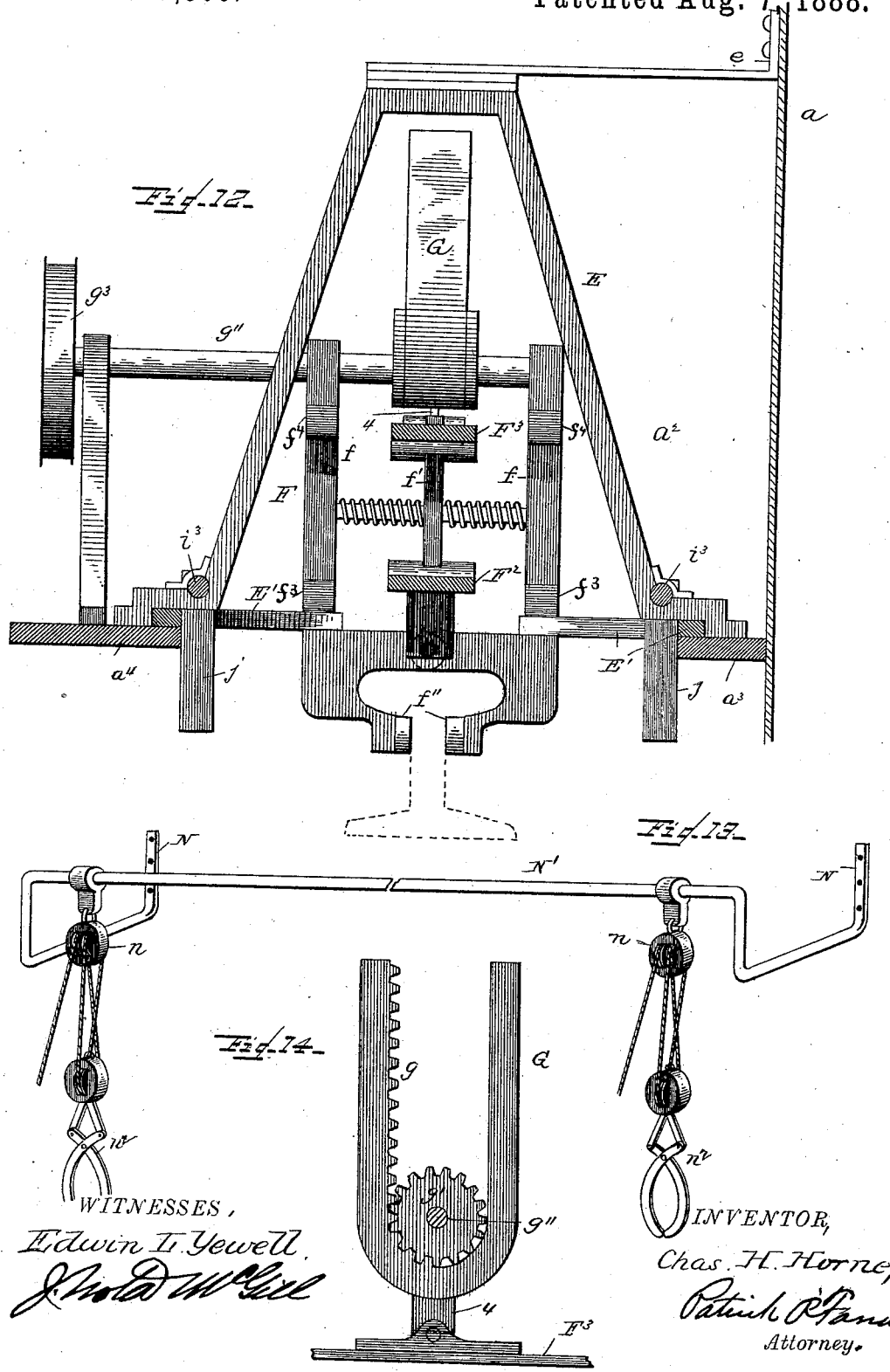

UNITED STATES PATENT OFFICE.

CHARLES HENERY HORNE, OF TUCSON, ARIZONA TERRITORY.

CONSTRUCTING RAILROADS.

SPECIFICATION forming part of Letters Patent No. 387,560, dated August 7, 1888.

Application filed June 25, 1887. Serial No. 242,493. (No model.)

*To all whom it may concern:*

Be it known that I, CHARLES HENERY HORNE, a citizen of the United States of America, residing at Tucson, in the county of Pima and Territory of Arizona, have invented certain new and useful Improvements in Constructing Railroads, of which the following is a specification, reference being had therein to the accompanying drawings.

This invention pertains to certain new and useful improvements in laying railroad rails and ties, having reference more particularly to the construction of the cars and means or methods for operating the ties and rails in the construction of the road; and to this end the invention consists in the detailed construction, combination, and arrangement of the parts, substantially as hereinafter fully set forth, and particularly pointed out in the claims.

Figure 10:
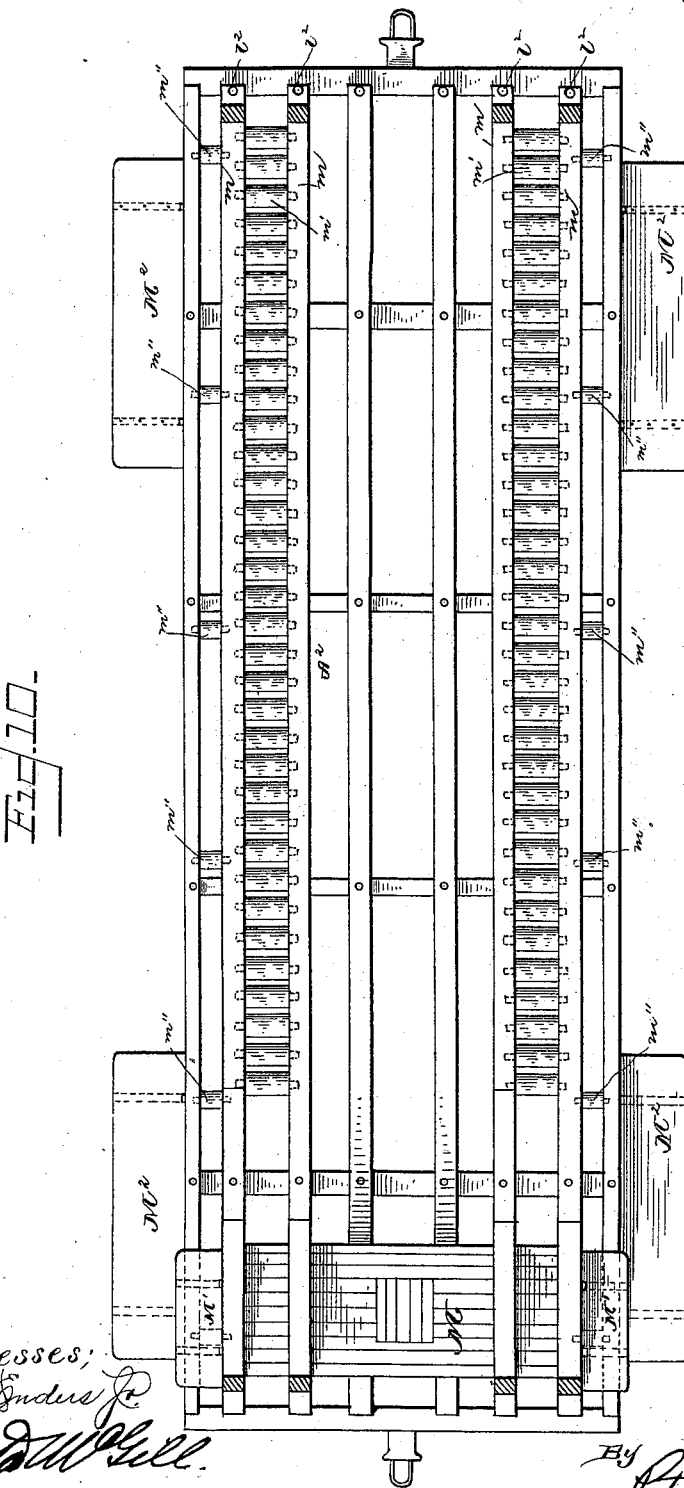
Figure 11:
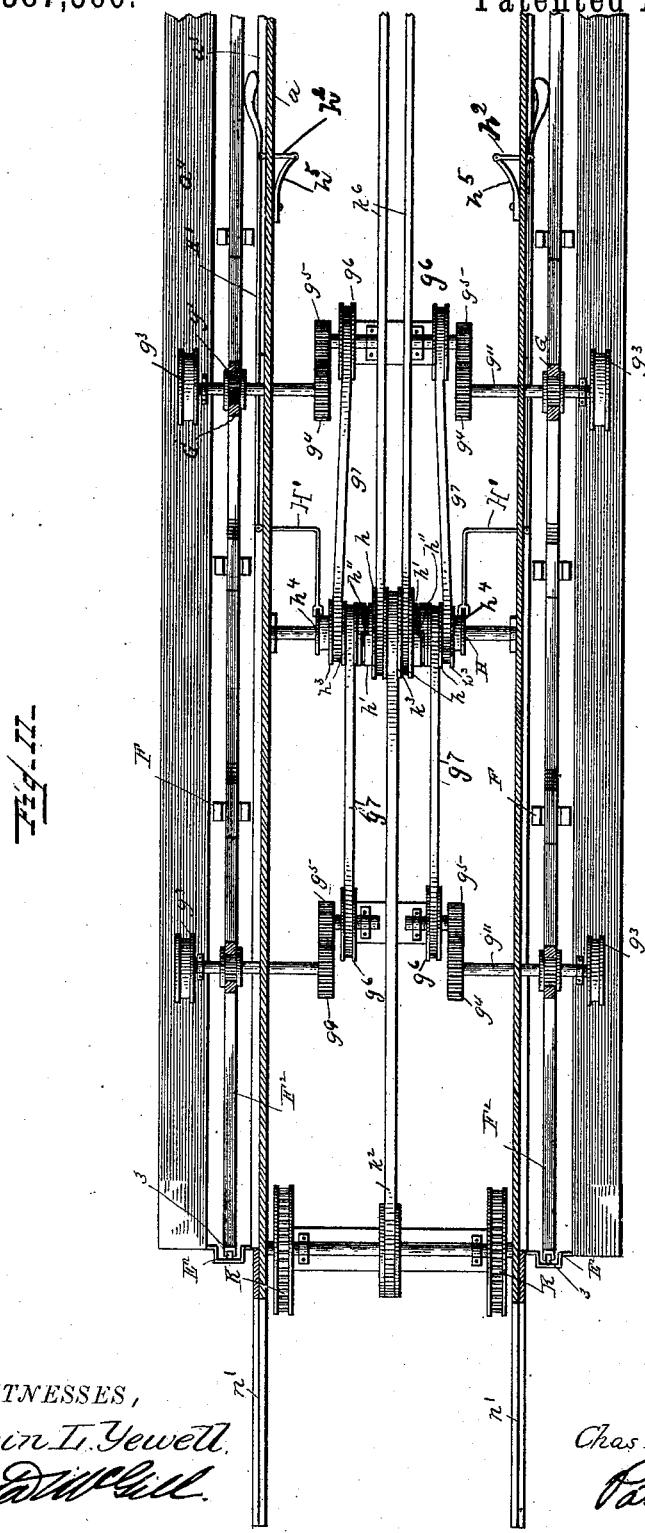

In the drawings, Figures 1 and $1^a$ are views in side elevation of portions of the main car of my invention. Fig. 2 is a horizontal sectional view of Fig. 1, showing parts in plan view. Fig. $2^a$ is a detail view of one of the rail-guides. Fig. 3 is a perspective view of the clutch-operating device. Fig. 4 is a detail view of one of the clutches. Figs. 5, 6, $6^a$, 7, and 8 are detail views of parts of the main car, reference to which will hereinafter be made more fully. Figs. 9 and 10 are side and plan views, respectively, of the tie-carrying cars. Fig. 11 is an enlarged view of that portion of Fig. 2 left of the line $x\,x$. Fig. 12 is a vertical sectional view showing the clutches elevated and the slide-plate in engagement with the notches thereof. Fig. 13 is a detail perspective view of the device for lowering curved rails. Fig. 14 is a side elevation of the U-shaped bar and pinion for raising the clutches, the same being also shown in plan view, Fig. 7; and Fig. 15 is an enlarged detail view in side elevation of the mechanism for controlling the brake-wheels.

Corresponding parts in the figures are denoted by the same letters of reference.

The main object of this invention is to provide means for the laying of railroad ties and rails by means of certain mechanism constructed upon a series of cars or trains, which cars or trains are designed to move forward over these rails in the construction of the road.

In carrying out my invention the train is composed of a series of cars, A A' $A^2$, the latter and two others of similar construction (not shown) forming the rearmost cars. All of these cars have their bolsters fitted directly upon the axles, no springs being employed, so as to give to each car the same height whether loaded or not.

The principal or main car A has forward and rearward extensions, $a\,a'$, the latter being supported or braced in position by means of long inclined brace-rods $a''\,a''$, secured at their ends to the lower sides of the car and the outer rear ends of the extension $a'$ on the sides thereof.

The car A, together with its forward extension, $a$, is provided on each side with an outwardly-projecting horizontally-disposed platform, $a^2$, the platform of the extension $a$ being composed of an inner and outer sill, $a^3\,a^4$. The platforms of the car A, like those of the adjoining rear cars, project out some distance beyond the platforms of the forward extension, $a$. This forward extension, $a$, is securely joined to the forward end of the car A by means of suitable inclined braces and brackets secured to the under sides of the car and extension and downwardly-projecting ledges, as shown, and the forward ends of the sills of the extension $a$ have secured thereto right-angular brackets C, securing or holding in position correspondingly-formed guide plates or ways C'. These guide-plates occupy a vertical position and project at their lower ends to within a short distance of the ground or road-bed. Near the forward and rear ends of the car A and extension $a$, respectively, are also secured right-angular brackets C, between which is secured an upright guideway, $E^2$, provided at about its center with an oblong opening, as shown.

D D are two correspondingly-formed vertically-disposed guides secured at their upper ends to the under side of the sills $a^3\,a^4$, and are each composed of an upper bar having a right-angular or flanged end, through which the bolts are passed for securing the same to the sills, and a lower pivoted arm, $d$, the upper portion of which works in a vertical slot in said upper bar. These guides, it will be seen, converge toward their upper ends, as shown in Fig. $2^a$. The lower arms, $d$, are provided with hooks whereby the same may be retained in an elevated position by means of short chains secured to the upper bars.

To the sills are secured in a vertical position six (more or less) brackets, E E, which at their upper ends have secured the horizontal portions of right-angular plates $e$, also secured to the sides of the extension $a$. (See Figs. 5 and 12.) The lower right-angular opposite ends of the brackets E have grooves formed therein, (see Fig. 12,) through which are passed long sliding plates E', which, as will be seen by reference to Fig. 8, are connected at their rear ends by a suitable connecting-bar, and said plates have opposite shoulders or offsets at suitable intervals apart. The rear end connecting-bar of the sliding plate E' has secured thereto one end of a heavy coil-spring, E'', secured at its other end by suitable means to the forward end of the platform of the car. To this end of the slide E' is connected one arm of a bent foot-lever, E$^4$, fulcrumed to the side of the platform of the car.

F F are a series of correspondingly-formed clutches, the same being disposed at suitable intervals apart, and each clutch consists of two correspondingly-formed levers, $f f$, having inwardly-projecting meeting portions fulcrumed on a common bolt or pin passed therethrough and through the lower opposite cheeks of a vertical bar or rod, $f'$. (See Fig. 4.) This bar or rod has two opposite projecting arms, whereon are disposed suitable coil-springs, the normal action of which is to retain the upper ends of the levers extended or in vertical position, the ends of said springs of course bearing against the inner sides of the upper ends of the levers, the ends of said arms of the bar or rod $f'$ extending into or entering small apertures in the said levers of the clutches. The lower ends of these levers, it will be observed, have an approximately-oblong opening, and the lower extended ends have small rollers $f''' f'''$, secured by means of short axles passed therethrough and through apertures in the said ends, the opposite outer ends of said axles being preferably slightly countersunk.

The bars or rods $f''$ of the clutches are passed through apertures formed at suitable intervals apart in a horizontal connecting guide-bar, F$^2$, the same being pivoted on the upper side thereof by means of a bolt or pin passed through said bar or rod $f'$ and retained by suitable keepers on said guide-bar, while the upper ends of said bars or rods $f'$ project through apertures in the upper portion of a long irregular second guide-bar, F$^3$, said bar or rod $f'$ being likewise pivoted to the under side of said guide-bar F$^3$. The forward and rear ends of these guide-bars F$^2$ F$^3$ are provided with forked plates, in which are hung suitable rollers, 2 3, which in practice are designed to slide within the grooved guide-plates C' E$^2$. The purpose of these guide-bars is to connect the series of clutches and to insure uniformity in the movement thereof, and to provide suitable means for connecting thereto parts of mechanism for raising and lowering said clutches.

G G are two approximately U-shaped bars having each a lower apertured lug or projection, 4, by means of which the same are pivoted to the upper guide-bar, F$^3$, the same being effected by ordinary means. On the rear inner side of each U-shaped bar G is formed a series of cogs or teeth, $g$, with which is designed to engage a small cog wheel or pinion, $g'$, the same being journaled on a shaft, $g''$, supported at its outer ends in a suitable box of a supporting-frame secured to the sill $a^4$, and having on said end a frictional brake-wheel, $g^3$, while the inner end of said shaft is passed through the side of the extension $a$ of the car and is provided with a gear wheel or pinion, $g^4$. The gear wheels or pinions $g^4 g^4$ on the inner ends of the shafts $g''$ are each designed to gear with small pinions $g^5$, whose shafts are supported at their ends by suitable means and have secured thereon band-pulleys $g^6$. Over these band-pulleys $g^6 g^6$ are passed suitable driving belts or bands, $g^7 g^7$, encompassing clutch-wheels $h^3$ of a main driving-shaft, H. To this driving-shaft are rigidly keyed or cast therewith two large band-wheels, $h$, with each of which is formed a small clutch-wheel, $h'$, having a portion of their outer surfaces removed, as shown, forming a lug or tooth, $h''$, with which is designed to engage the tooth of each clutch-wheel $h^3$.

The clutch-wheels $h^3$ on the shaft H, over which are passed the belts or bands $g^7$, have formed fast therewith small wheels $h^4$, with each of which engages the inner forked end of a bent lever, H', the same being passed through apertures in the sides of the extension $a$, at which point they are jointed or bent and extended rearwardly a suitable distance and fulcrumed at about their centers. Near their rear handled ends said levers are provided with fingers $h^2$, which are extended through apertures in the sides of said extension and engaged by springs $h^5$, secured to the inner sides of the extension, said springs being designed to hold said handled ends of the levers close against the sides of the extension and the clutch-wheels $h^3$ from contact with the clutch-wheels $h'$. By pulling outwardly on the handled ends of the levers H' the clutch-wheels $h^3$ can be thrown into gear with the adjoining clutch-wheels $h'$, fast upon the shaft H, causing said clutch-wheels $h^3$ to revolve, and thus transmit motion through the belts or bands $g^7$, wheels or pulleys $g^6$, and cog or gear wheels $g^5$ to the wheels $g^4$, which will effect the revolution of the shafts $g''$, and consequently the wheels or pinions $g'$. This last-described operation occurs when the clutches have been lowered (the manner of which is to be described) and it is desired to raise the same, the raising being effected by the wheels or pinions $g'$, gearing with the racks of the U-shaped bars G.

At about the center of the sills $a^3 a^4$ is secured a suitable bracket, I, (see Fig. 3,) to the inner sides of which are secured the ends of a second horizontal cross-plate, $i$, between which and the top cross-plate of the bracket is a cross bar or arm, $i'$, the same being pivotally secured by means of a small rod passed therethrough and through said cross-plates. To the ends of this pivoted bar or arm $i'$ are secured the ends of suitable links connected at their opposite ends to the upper ends of bars or rods $i^2 i^2$, which bars or rods $i^2$ are secured to long square-shaped bars $i^3 i^3$. To the upper end of the pivotal rod of the cross bar or arm $i'$ is secured one end of a curved arm, $i^4$, the other end of said arm having connected thereto the end of a long rod, $i^5$, (shown in dotted lines, Fig. 3,) connected at its outer end to the upper end of a hand-lever, $i^6$, fulcrumed on a rod, $i^7$. The curved arm $i^4$ is supported in its movement by a suitable curved plate, $i^8$, secured to the bracket I.

The square rods or bars $i^3$ have rounded portions at the points where secured to the supporting-brackets E, and these rods have oppositely-disposed short arms $j$, which in practice are designed to work within the slide E′ between the narrow portions thereof and to rest in suitable slots formed therefor in the sills $a^3 a^4$. (See Fig. 3.) The object of these short arms is to effect the closing of the upper ends of the levers of each clutch, and consequently the opening of the lower ends thereof. From what has been said of these parts it will be seen that by pulling rearward on the hand-lever $i^6$ the same will, through the agency of the long rod $i^5$ and the curved arm $i^4$, effect the partial revolution of the bars or rods $i^3$ and the forcing inward of the short arms $j$.

To about the center of the outer sill, $a^4$, is secured a suitable bracket, $j'$, to which is connected a pivotal arm, $j''$, connected at its upper end to one end of a long rod, $j^2$, secured to a small hand-lever, $J^3$, pivoted at its end on the rod $i^7$. To the arm $j''$ is attached a long wire rod, $j^4$, the ends of which are connected to the upper ends of two armed pivoted brackets, $j^5 j^5$, and to short arm $j^6$, pivoted on the upper ends of upright plates secured to the outer sill, $a^4$, and to these brackets $j^5$ are secured the ends of a suitable friction-brake passed over the pulley $g^3$ on the end of the shaft $g''$. (See Figs. 1 and 15.)

Between the forward vertical ends of the corresponding sections of the guideway C is pivoted the long arm of a lever, J, (see Figs. 1 and 6ª,) the lower end of which has a portion of its rear surface removed, wherein fits the upper arm of a second short lever, J′, the curved thickened end of which projects a short distance below the sections of the guideway C′. To the upper end of this lever J is connected one end of a long rod, J², secured at its other end to one end of a hand-lever, J³, also fulcrumed on the rod $i^7$.

Within openings of the side platforms, $a^2$, of the car A are suitably journaled at short distances apart rollers $k\ k$, disposed slightly below the upper surfaces of said platforms.

At the rear and forward ends of the rearward and forward extensions, $a' a$, of the car A are secured upon the ends of axles large rollers or sprocket-wheels K K′, and at suitable distances apart, within close proximity to each other, are secured on either side of the upper portion of the car from end to end small grooved wheels or rollers $k'$, the shafts of which project from right-angular plates secured to the inner side of the upper portion of the car and extensions $a$ and $a'$. Beneath these grooved wheels or rollers are likewise secured in the same manner, but at greater distances apart, similar grooved wheels or rollers, $k''$.

L L are long endless chains or belts, which are passed each over the end sprocket wheels or rollers, K K′, and the smaller grooved wheels or rollers, $k'$, in the forward movement of said endless chains or belts, while in its return or reverse movement said chains or belts rest upon the lower series of rollers, $k''$.

The endless chain belt is composed of a series of links pivotally connected to each other, each link having a tongue and a groove for entering and receiving a groove and tongue, respectively, of the adjoining links. Each link is square-shaped at its ends, so that when pivoted together they are not liable to sag. The upper surfaces of the links have formed integral therewith short projections or teeth to aid in carrying forward the railroad-ties, while from the under sides project short thickened lugs entering the grooves in the wheels or pulleys $k'$, the horizontal projecting portions of the links resting on the periphery of each of said pulleys or wheels, as shown.

Around a central band-wheel fast on the revolving shaft or axle of the forward sprocket-wheel, K′, is passed a driving-belt, $k^2$, which is passed around a large central pulley, $k^3$, on the center of the shaft H, which, as will be seen by reference to Fig. 2, extends from side to side of the forward extension, $a$, the same having on both sides pulleys and wheels, before described, for transmitting motion to the mechanism for raising the clutches on both sides of the car.

Within the forward end of the car A is disposed a suitable engine (not shown) of ordinary construction for transmitting motion to or driving a crank-shaft, $k^4$, having on its outer end suitable balance-wheels. (See Fig. 2.) Around band-wheels $k^5 k^5$ on this crank-shaft are passed suitable driving-belts, $k^6 k^6$, encompassing the driving-pulleys $h\ h$ on the shaft H.

The car A′ is an ordinary flat car, and is coupled to the car A at the rear end thereof. (See Fig. 1ª.) This car also has rollers $k\ k$, projecting across its platform slightly below the outer projecting edges of the car. This car, as also the car A, has normally longitudinally-disposed rollers $l'$, secured in trunnions or apertured posts on the outer edges of the outer sills, one end of each of said rollers being removably secured in a slotted trunnion, while the other end is held in a pivotal or rotatable trunnion, so as to permit of placing the rollers $l'$ into the position shown in dotted lines, Fig. 2, a second slotted trunnion, $l$, being secured near the inner edge of the outer sill, $a^4$, for this purpose.

The car $A^2$, coupled to the car $A'$, is what I term the "tie-carrying car," and has at its rear end, on either side of the center, two upright posts or standards, $l^2 l^2$, to which are secured the upper rear ends of inclined bars $m$ $m$, between which are journaled small rollers $m'$, the same extending to a point a short distance from the forward end of the car $A^2$, at which point is formed a small platform, as shown. (See Figs. 9 and 10.) Immediately adjoining this platform, extending to the forward end of the car, is a water-tank, M, on the upper portion of which is formed a second platform, as shown. On either side of this tank M is secured a long strip or standing platform, M'. This car is also provided with small rollers $m''$, similar to the rollers $k$ of the cars A A'. On either side of this car $A^2$, near the front and rear ends thereof, are disposed platforms $M^2 M^2$. On each side of the car A' is disposed a long continuous platform, $M^3$, while at the center of the car A is disposed on either side a similar but smaller platform or step, $M^4$, (see Fig. 1$^a$,) said steps or platforms $M^4$ being connected to the platforms $a^2$ of the car A. In under the car A is disposed a suitable tank, $M^5$, for supplying water to the engine, said tank being filled with water by means of a suitable pipe (not shown) connecting with the water-tank M of the car $A^2$.

In practice the car $A^2$ is first supplied with a desired number of railroad-ties, the same being passed from a rear car (not shown) on the upper rear ends of the inclined roller-frames, whereby said ties are carried forward to the lower end of said frames. From this point they are lifted by an attendant standing on the platform $M^2$ up to the platform on top of the water-tank M, from which point they are lifted by other attendants on to the upper rear ends of the corresponding endless chains or belts.

The car A', I term the "rail-car," the same being designed to carry the rails used in the construction of the railroad, which has four short upright posts, as shown, for retaining the rails in position and preventing the same from slipping while the car is in motion.

Adjoining the car $A^2$ is generally another car similar in construction to said car $A^2$, save that it is not provided with the water-tank, and next to this car is a car similar to the rail-car A', both of these cars having rollers similar to the rollers $k\ m''$, before referred to. The object of these rollers $k\ m''$ is that the attendants, standing on the long platform of the rail-car, upon taking hold of one of the rails will force the same over the rollers of the cars A A', and also for supplying the rail-car from a rear similar car. (Not shown.) It will be observed that near the forward portion of the car A the space between the platform $a^2$ and the floor of the car is greatly diminished as compared with the distance between said sills throughout the remainder of the length of the car, the object of which is that in sliding a rail over the rollers $k$ the same upon coming to the contracted portion of the sills will fit snugly therein, and upon passing through the before-referred-to opening or aperture of the rear guideway-plate, $E^2$, will enter the lower end of the adjoining pair of the series of clutches, and will be passed on through the lower recesses of the entire series until the rear end of the rail is entirely freed of said guideway-plate. It will be observed that these clutches are so constructed as to cause the forward pair of the series to occupy a lower plane than those in rear thereof, and an inclination being observed to the rearmost pair of clutches, as shown, whereby upon sliding a rail in position the same will have the tendency to move forward over the small rollers on the opposite ends of the levers of the clutches. As before stated, the object of the rollers $l'$ is to provide means for moving forward the curved rails, said rollers for this purpose being changed from the position shown in full lines to that shown in dotted lines, Fig. 2, the securing of one end of the roller in either one of two slotted trunnions and the rotatably securing of the other trunnion permitting of this arrangement.

To provide means for lowering the curved rails to the railroad-ties, I secure to the sides of the extension $a$ of the car A approximately L-shaped securing-plates N, to the outer ends of which are connected the bent ends of a long rod, N'. On this rod are designed to slide the overlapping hanger-plates of double pulleys $n$, through which are passed suitable ropes carrying single pulleys, to which are connected ordinary grappling-forks, $n^2$. By means of sliding the outer forward double pulley, together with its grappling-fork, to the rear end of the rod N' and attaching the same to the projecting end of the curved rail the same can, by sliding said double pulley to its former position, be entirely removed from the outer sill of the platform of the car A, just prior to which the inner or rear grappling-fork is secured to the rail, whereby the latter can be readily lowered to the road-bed. It will be seen that I have provided at the forward ends of the side platforms of the car A seats O, on each of which sits an attendant in charge of the levers disposed contiguously thereto, and also to operate the foot-lever for moving the slide E'. At the forward end of the extension $a$, I have provided inclined bars $n'$, secured in position by suitable brace-bars, as shown, one of said brace-bars being connected to the forward vertical end of the side platform of the extension $a$.

In practice the piston-rod of the driving-engine is connected to the crank-pin of the shaft $k^4$, whereby motion is transmitted by the wheels or pulleys $k^5$, through the belts $k^6$, to the pulleys of the large shaft H. The pulleys $h\,h$, being in engagement with the other pulleys on said shaft by means of the clutch-wheels $h'\,h^3$, will, through the agency of the belts $g^7$, cause the band-wheels $g^6$ to revolve. The pinions on the shafts of said latter band-wheels, gearing with the larger pinions, $g^4$, will cause the revolution of the shafts $g''$, effecting the turning of the pinions $g'$ within the U-shaped bars G, whereby the raising of said U-shaped bars, together with the clutches, will be effected in a manner and at the desired time, more fully pointed out farther on.

In the revolution of the shaft H motion will be transmitted by means of the belt $k^2$ to the band-pulley on the shaft of the sprocket-wheels K', effecting the turning of said wheels, which will cause the endless chain belt L to travel over the sprocket-wheels K K' and the small grooved pulleys $k'\,k''$.

The attendants, standing on the platforms M' on either side of the water-tank, pass the ties up onto the endless chain belts, so as to be transversely disposed thereon, whereby in the forward movement of said belts said ties will be carried to the forward end of the extension $a$, and upon passing over the sprocket-wheels at that end will slide down on the inclined bars $n'$, falling upon the road-bed, where they are properly placed in position by two or more attendants ready for reception of the rails. The attendants on the platforms of the rail-carrying car A' and the car A place the rails on the rollers $k$, over which said rails are slid forward until they reach the rear guideway upright plate, $E^2$, where they are guided through the hereinbefore-referred-to aperture in said guideway-plate. The attendant at the seat O causes the end of the rail to properly pass between the lower ends of the levers of the adjoining clutch. Said rail, by reason of the inclination occupied by said clutches, will slide forward until the end thereof reaches the forward guideway upright plate, when the rear end will have passed entirely through and be free of the rear one of said upright plates. This being accomplished, the said attendant on the seat O will press upon the foot-lever $E^4$, causing the retraction of the spring-held sliding plate E', freeing the abutments thereof from contact with the lower notches, $f^3$, of the clutches, and the wheel $g'$, not being in motion by reason of the clutches $h'\,h^3$ being held out of gear by the levers H', will permit the lowering of the U-shaped bars and clutches, together with the rail suspended by said clutches, the downward movement thereof being controlled by the brake-wheels $g^3$ and their brakes. The clutches being lowered the desired extent—to within a short distance of the ties—and held by means of the upper notches, $f^4$, bearing upon the abutments of the sliding plates E', the attendant, upon pulling rearwardly on the lever $i^6$, connected to the connecting-rod $i^5$, will, through the agency of the curved arm $i^4$ and its connected parts, cause the partial revolution of the bars $i^3$, whereby the short opposite arms $j$ thereof will be projected inwardly and press against the upper outer ends of the levers of the now-lowered clutches, causing the contraction thereof as against the action of the springs, effecting the dropping of the rail by reason of the opening of the lower ends of said levers. The rail in its descent is guided by the oppositely-disposed parallel guides D D until the same reaches the ties, as hereinbefore intimated. Should the rail extend too far forward, the same can be moved back to the last-laid rail by means of the short lever J', pivoted in the forward guideway upright plate, the lower end of said lever being forced against the end of said rail by reason of the forcing outward of the lower arm of the upper longer lever, J, to the upper end of which is connected the long connecting-rod $J^2$, operated by the lever $J^3$, grasped by the attendant. The rail having been lowered, the clutches are returned to their elevated position ready for the reception of another rail by throwing the operating mechanism into gear through the agency of the levers H', causing the intermeshing of the clutch-wheels $h'\,h^3$, and consequently causing the revolution of the wheels $g'$, which, upon gearing with the teeth of the U-shaped bars G, will effect the raising thereof, together with the clutches, until the lower set of projections or notches, $f^3$, on said clutches rest upon the abutments of the guide-plates E', said projections in the ascent of the clutches effecting the sliding rearward of the plates E' as against the action of the spring E'', after the passage of which said spring will force said slide forward under the lower projections or notches, $f^3$, of said clutches.

In practice suitable devices are employed for the spacing of the rails. When curved rails are to be lowered in the manner hereinbefore described, it will be understood, of course, that the clutches are not employed. After laying of the rails, as above described, the same are secured in position by suitable spikes driven by attendants.

It will be observed that the lowering of the clutches, together with the rail, is regulated by means of the friction-brakes on the wheels of the shaft $g^2$, said brakes being operated through the agency of the lever $j^3$ and connecting-rod $j^2$, connected to the arm $j''$, as hereinbefore fully set forth. After thus securing a rail in position, the cars are moved forward by means of a locomotive attached to the rearmost car until the forward wheels of the car A reach a point near the forward ends of the last-laid rails, after which the operation is repeated.

In general I have described the mechanism situated on one side of the cars, while it will be understood the very counterpart thereof is employed on the other side of the cars.

I claim as my invention—

1. As an improvement in railroad-rail laying, the combination herein described, comprising the car and its extensions, having endless chain belts carrying the ties, the rail-car, the rollers secured in the sills of said cars, and the tie-car having inclined roller-frames and the mechanism for lowering said rails, all constructed and arranged and designed to operate substantially as shown and described.

2. The combination, with the car having the forward and rearward extensions, of the sprocket-wheels secured at the ends of said extensions, the grooved pulleys, the endless chain belts, and the driving mechanism, substantially as shown and described.

3. The combination, with the car having the forward extension provided with side platforms, of the series of clutches, the spring-held guide-plates, the U-shaped bars and the pinions or cog-wheels, the friction-brakes, and the operating mechanism, substantially as shown and described.

4. The combination, with the car having the forward extension, of the vertically-disposed guides D D, having lower pivoted ends, substantially as shown and described, whereby the rails are guided into position, as set forth.

5. The combination, with the clutches, of the plates F² F³, carrying rollers 2 3 at their ends, and the upright guideway-plates C' and E², wherein said rollers are designed to slide, substantially as shown and described.

6. The combination, with the clutches and their lowering and raising mechanism, of the bars having projecting arms, the uprights connected thereto, the connecting-links, the pivoted cross-bar, the curved arm, the connecting-rod, and the operating-lever connected to said connecting-bar, substantially as shown and described.

7. The combination, with the clutches having two sets of rearward projections or notches, of the spring-held sliding plates having abutments and the foot-lever, arranged substantially as shown, and for the purpose stated.

8. The herein-described clutches, consisting of the levers having projecting portions, the rollers secured at the lower ends of said levers, the vertical bars having projecting arms, and the springs on said arms bearing against said levers, substantially as described.

9. The combination, with the clutches and the vertical bars, of the guide-plates pivoted to said bars, the U-shaped bars having teeth in one portion thereof, the cog-wheels, and the operating mechanism, substantially as shown and described.

10. The combination, with the clutches and guide-plates carrying rollers at their ends, of the guideway upright plates, wherein the ends of said guide-plates project, the pivoted levers secured in one of said upright plates, the connecting-rod, and the operating-lever, substantially as shown, and for the purpose set forth.

11. The herein-described tie-car comprising the inclined roller-frames secured at their upper rear ends to posts or standards and the platforms at the lower ends of said inclined frames, arranged substantially as shown and described.

12. The combination, with the cars, of the rollers secured in pivoted posts on the upper surfaces of the outer sill of the cars for passing the curved rails, substantially as shown and described.

13. The combination, with the car having the forward extension, of the L-shaped bars or brackets having the outwardly-projecting portion and the double pulleys sliding on said bar and carrying hooks at their lower ends, arranged substantially as shown, and for the purpose stated.

In testimony whereof I affix my signature in presence of two witnesses.

CHARLES HENERY HORNE.

Witnesses:
LAWRENCE MORAN,
WILLIAM B. MARKHAM.